(12) United States Patent
Zarife

(10) Patent No.: US 9,262,920 B2
(45) Date of Patent: Feb. 16, 2016

(54) METHODS AND DEVICES FOR OUTPUTTING INFORMATION IN A MOTOR VEHICLE

(71) Applicant: GM GLOBAL TECHNOLOGY OPERATIONS LLC, Detroit, MI (US)

(72) Inventor: Rami Zarife, Mainz (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 61 days.

(21) Appl. No.: 14/081,302

(22) Filed: Nov. 15, 2013

(65) Prior Publication Data

US 2014/0139355 A1 May 22, 2014

(30) Foreign Application Priority Data

Nov. 17, 2012 (DE) .......................... 10 2012 022 819

(51) Int. Cl.
*B60Q 1/00* (2006.01)
*G08G 1/0962* (2006.01)
*G08G 1/16* (2006.01)
*G06K 9/00* (2006.01)

(52) U.S. Cl.
CPC .......... *G08G 1/0962* (2013.01); *G06K 9/00845* (2013.01); *G08G 1/166* (2013.01); *G08G 1/167* (2013.01); *G06K 9/00* (2013.01)

(58) Field of Classification Search
CPC ...................................... G06K 9/00
USPC ............ 340/903, 435, 937, 436; 348/78, 148, 348/149; 701/45; 382/103
See application file for complete search history.

(56) References Cited

U.S. PATENT DOCUMENTS

| 6,675,075 | B1 | 1/2004 | Engelsberg et al. |
| 2004/0150514 | A1* | 8/2004 | Newman et al. ............... 340/435 |
| 2004/0178894 | A1 | 9/2004 | Janssen |
| 2005/0273264 | A1* | 12/2005 | Gern et al. ..................... 701/301 |
| 2009/0243880 | A1* | 10/2009 | Kiuchi ........................... 340/903 |
| 2010/0220892 | A1* | 9/2010 | Kawabuko ..................... 382/103 |
| 2011/0169625 | A1* | 7/2011 | James et al. ................... 340/439 |

FOREIGN PATENT DOCUMENTS

| DE | 10039795 | A1 | 3/2002 |
| DE | 10338647 | A1 | 3/2005 |
| DE | 102005003535 | A1 | 8/2006 |
| DE | 102006059254 | A1 | 6/2008 |
| DE | 102007045932 | A1 | 4/2009 |
| DE | 102010013243 | A1 | 9/2011 |

OTHER PUBLICATIONS

German Patent Office, German Patent Search Report for Application No. 102012022819.8, dated May 28, 1013.

* cited by examiner

*Primary Examiner* — Brent Swarthout
(74) *Attorney, Agent, or Firm* — Ingrassia Fisher & Lorenz PC

(57) ABSTRACT

A method and to a device are provided for outputting information in a motor vehicle, in which as a function of an event visual and/or acoustic information is output to a driver of the motor vehicle. In order to achieve an improved choice of the suitable timing of the outputting of the information it is provided that the time between registering of the event and outputting of the information is set as a function of the orientation of the driver's head.

15 Claims, 3 Drawing Sheets

METHODS AND DEVICES FOR OUTPUTTING INFORMATION IN A MOTOR VEHICLE

CROSS-REFERENCE TO RELATED APPLICATION

This application claims priority to German Patent Application No. 10 2012 022 819.8, filed Nov. 17, 2012, which is incorporated herein by reference in its entirety.

TECHNICAL FIELD

The technical field relates to methods and devices for outputting information in a motor vehicle, in which, as a function of an event, visual and/or acoustic information is output to a driver of the motor vehicle.

BACKGROUND

Methods and devices of the types mentioned at the outset are known in the prior art. For example, DE 199 51 001 A1 discloses a device for presenting information in a vehicle which serves to present information as a function of the viewing direction of the driver. The device disclosed there comprises a computer, a device for the visual and/or acoustic presentation, a device for the detection of the viewing direction of the driver and various data sources. The device for the detection of the viewing direction of the driver transmit the measured viewing direction of the driver to the computer, so that the computer transmits this viewing direction to the device for the visual and/or acoustic presentation, so that the presentation of information from the various data sources is faded into the field of vision of the driver.

DE 10 2005 0035 35 A1 discloses a method for the outputting of information by the device of visual or acoustic signaling devices, in particular in a vehicle, in which the viewing direction of an information recipient is detected and the information output is controlled as a function of the detected viewing direction. The information is displayed on the visual signaling device only if the information recipient looks at this signaling device. The information is only output with the acoustic signaling devices when the information recipient looks at a region in the vehicle defined for activating the respective information output.

For outputting acoustic or visual information, the known prior art merely takes into account the viewing direction of the driver. This is helpful in order to estimate if the driver is at all able to perceive the information, in particular in the case of visual information. However, the known prior art cannot take into account if the driver is actually able to comprehend the reason for the outputting of the information. This does not only depend on the viewing direction of the driver but also at what the driver's attention happens to be directed at that time. Such information is frequently output in order to inform or warn regarding events that take place outside the vehicle.

In view of the foregoing, at least one object is to improve the methods and devices for outputting information mentioned at the outset to the effect that a more target-oriented output of information is possible, which can better inform the driver than existing methods and devices. In addition, other objects, desirable features and characteristics will become apparent from the subsequent summary and detailed description, and the appended claims, taken in conjunction with the accompanying drawings and this background.

SUMMARY

The method for outputting information in a motor vehicle according to an embodiment provides that as a function of an event, visual and/or acoustic information is output to a driver of the motor vehicle. Here, it is provided that the time between registering of the event and outputting of the information is adjusted as a function of the orientation of the driver's head. Consequently, when an event is registered by suitable device in the motor vehicle which justifies outputting information to the driver, the orientation of the driver's head is initially established according to the method and as a function of the orientation, a corresponding time delay pending the information output set.

Should, for example, a certain event take place left of the motor vehicle and the driver's head is oriented to the left, it is sufficient to inform the driver about the event only at a comparatively late stage. If the driver's head however is turned to the right at the time of the event, an earlier information output is practical for drivers can usually react in a more target-oriented manner when they have perceived the event visually as well. Thus, the driver is given more time to locate and register the relevant event in order to take suitable measures thereafter. The embodiment makes use of the discovery that not only the position of the eyes but substantially the position of the driver's head is an objective parameter for the current object of the driver's attention.

According to a first possible further embodiment of the method it can be provided that the event comprises a traffic event that occurs outside the vehicle. Such a traffic event can for example be an approaching other motor vehicle or such which is on a collision course with one's own motor vehicle. Such events occur frequently when changing lanes, during which another motor vehicle is located in a blind spot or also at intersections, at which other motor vehicles pass the respective other road. In moving traffic, undershooting an, if applicable speed, dependent minimum distance between a vehicle travelling ahead and the respective vehicle or a following vehicle and the respective vehicle can also trigger a corresponding event.

According to a further embodiment of the method it can be provided that the event comprises an activity of the driver. Such an activity can for example be the initiating of a lane change, which other motor vehicles can detect among other things by the indicating or by the approaching of a lane boundary. In such an event, a suitably equipped system can detect if the driver intends a lane change and can check the relevant traffic on the new lane and output a warning to the driver if applicable. Further application possibilities are lane-keeping assistants and the like. According to a further embodiment it can be provided that the items of information are warning signals.

In a further embodiment it can be provided that the outputting of the information in the vehicle is spatially coupled to the location of the event. If the event for example takes place to the left or right of the motor vehicle, visual and/or acoustic information can preferably also originate from the left or right. If the event causing the outputting of information occurs in front of or behind the motor vehicle, the relevant visual and/or acoustic information can likewise be arranged in front of or behind the driver. In particular, when outputting acoustic information, the driver is thus rapidly provided with information as to the direction he should focus his attention on.

According to a further embodiment it can be provided that the orientation of the driver's head is detected with an optical detection device. Such optical detection devices are frequently already provided in later-model motor vehicles for other purposes, for example as part of a fatigue warning system. The method can then be realized in the motor vehicle with relatively low material expenditure.

According to a further embodiment it can be provided that the time between registering of the event and outputting of the information is set as a function of the movement of the driver's head. Then, not only is the static orientation of the driver's head, but also the dynamic movement of the driver's head taken into account. Should the driver for example just happen to turn his head to the right while an event triggering an information output occurs to the left hand side of the vehicle, the information output can be carried out with a delay that is shorter than usual in order to give the driver sufficient time to comprehend the situation. Should the driver already turn his head to the left during the event, it is sufficient to initiate the relevant information output later on, i.e., in a more delayed manner.

According to a further embodiment it can be provided that the speed of a head rotation of the driver is taken into account. The head rotation can for example be carried out through comparison of successive images in which a respective head position of the driver is detectable. The speed of the rotation can then be determined from the images using a suitable algorithm.

According to a further embodiment it can be provided that the time between registering of the event and outputting of the information is set as a function of the viewing direction of the driver. In this case, the viewing direction of the driver is also taken into account besides the orientation of the driver's head. It is thus conceivable that although the driver has turned his head in a direction, but has already cast his eyes in the other direction. This can be utilized for setting or precision-setting the appropriate timing for outputting the information.

According to a further embodiment it can be provided that the time between registering of the event and outputting of the information is set as a function of the type of the event. For this purpose, the events can for example be classified, in the case of a collision warner for example based on the distance or the relevant speed of the vehicles which are on a collision course.

According to a further embodiment it can be provided that the output intensity is set from the orientation of the head, the movement of the head, the viewing direction of the driver and/or the type of the event. Thus, the risk of a possible confusion of the driver is reduced and an appropriate information output can be achieved. The intensity, in the case of an acoustic output, can for example be the volume, the pitch of the tone and/or the type of the tone or the tone sequence or of the noise, in the case of a visual output for example via the brightness, color, flashing frequency or type of the display.

A device is also provided for carrying out a method for outputting information in a motor vehicle with a device for outputting visual and/or acoustic information to a driver of the motor vehicle as a function of an event. A device is provided in order to set the time between registering of the event and outputting of the information as a function of the orientation of a driver's head. To this end, a device is provided in order to detect the orientation of the driver's head.

According to an embodiment it can be provided that the device for detecting a traffic event that occurs outside the vehicle is present, with a corresponding detection. According to a further embodiment, a device is provided for detecting an activity of the driver.

According to a further possible embodiment, a device can be provided which spatially couples the outputting of the information to the location of the event. According to a further embodiment, an optical detection device can be provided with the help of which the orientation of the driver's head is detected.

According to a further embodiment, a device can be provided which sets the time between registering of the event and outputting of the information as a function of the movement of the driver's head. To this end, a device is provided in order to detect the movement of the driver's head. This device can for example be indicated through the previously described detection device.

According to a further embodiment, a device for detecting the viewing direction of the driver can be provided, and a device in order to set the time between registering of the event and outputting of the information as a function of the detected viewing direction.

According to a further embodiment, a device for detecting the type of the event can be provided, so that with the device for setting the time delay the relevant delay time can be set taking into account the type of the event.

According to a further embodiment it can be provided that a device for adjusting the intensity of the outputting of the information makes adjustments as function of the orientation of the head, of the movement of the head, of the viewing direction of the driver and/or of the type of the event.

A device is also provided for outputting information in a motor vehicle, with at least one sensor for detecting an event, a visual and/or acoustic information outputting device and a control device, with which the at least one sensor and the visual and/or acoustic information outputting device are coupled.

According to another embodiment, a device is provided for detecting the orientation of a driver's head that is coupled to the control device. The control device is designed in such a manner that the time between detecting the event and outputting the information is dependent on the orientation of the driver's head. For this purpose, the control device can for example comprise a delay circuit or a corresponding delay programming which as a function of the incoming information sets a corresponding time between detecting of the event and outputting of the information. With the help of the device, outputting of information that is adapted to a situation can be achieved, which takes into account the driving state of a relevant vehicle and the relevant circumstances relating to the driver.

According to another embodiment, a device is provided for detecting the viewing direction of the driver. In addition to the orientation, the viewing direction of the driver can thereby be additionally taken into account, as a result of which the information output can take place in an even more target-oriented manner. Thus, a visual display can for example be omitted if such is not situated in the field of vision of the driver.

According to a further embodiment it can be provided that the device for detecting the orientation of the driver's head and/or of the viewing direction of the driver is an interior camera. Such an interior camera is provided in some vehicles anyhow and can then be further used for the relevant device.

According to a further possible embodiment, the information outputting device can comprise at least one loudspeaker as an acoustic information outputting device and/or at least one visual display as visual information outputting device.

According to a first possible embodiment, a driver assistance system can be provided, which is coupled to the control device. At least one sensor is part of the driver assistance system. Accordingly, the device can also be designed as a driver assistance system.

According to another embodiment, the driver assistance system can comprise a lane changing assistant, an intersection assistant and/or a fatigue warner.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
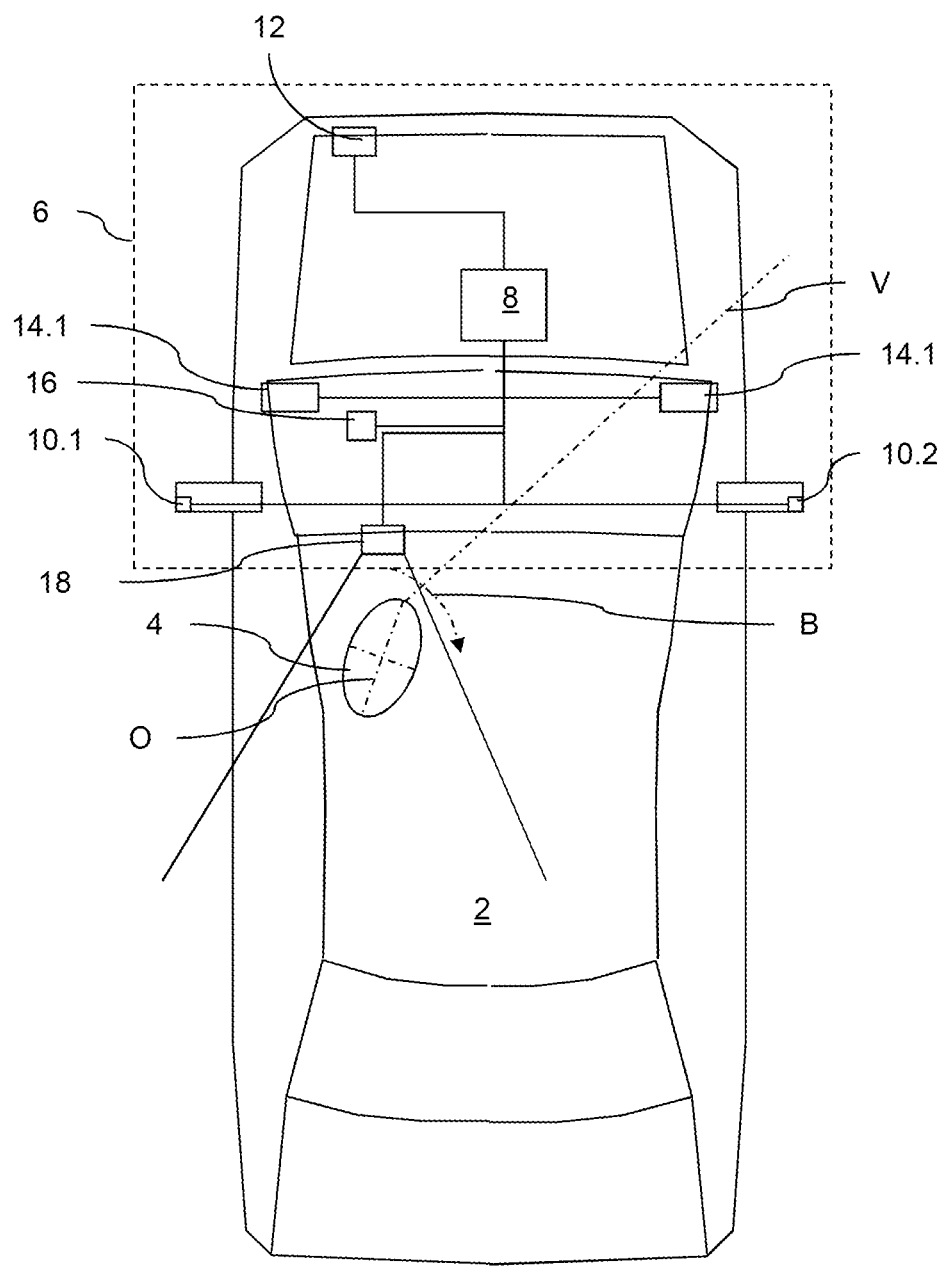
FIG. 1 is a top view of a motor vehicle according to an embodiment.

FIG. 1 shows a motor vehicle 2 according to an embodiment. The motor vehicle 2 is driven by a driver with a head 4. In FIG. 1, the driver currently turns his head 4 to the right, as indicated by the arrow. The motor vehicle 2 comprises an information device 6, the components of which are frame in interrupted lines.

A central component of the information device 6 is a control device 8, which processes and controls the incoming signals and information to be output. The control device 8 is connected to a plurality of sensors for detecting events that occur round about the motor vehicle 2, for example with blind spot sensors 10.1, 10.2 and a front sensor 12, which is able to detect the distance of motor vehicles travelling ahead and/or laterally approaching motor vehicles. The information device 6, furthermore, is equipped with information outputting devices, for example loudspeakers 14.1, 14.2 and a visual display 16.

For detecting the orientation O of the driver's head 4, an interior camera 18 is provided. With the help of the interior camera 18, the movement B of the driver's head 4 and the viewing direction V of the driver can be detected in addition to the orientation of the driver's head. The movement B of the head 4 can for example be carried out through comparison of two successive images recorded with the interior camera 18. The movement B of the driver's head 4 can also be a rotary movement to the left or the right for example.

The information device 6 is configured in such a manner that it can detect both the direction of the movement B as well as the speed of the movement B. The recording range of the interior camera 18 is large enough in order to detect the driver's head 4, which is represented by the corresponding funnel.

Figure 2:
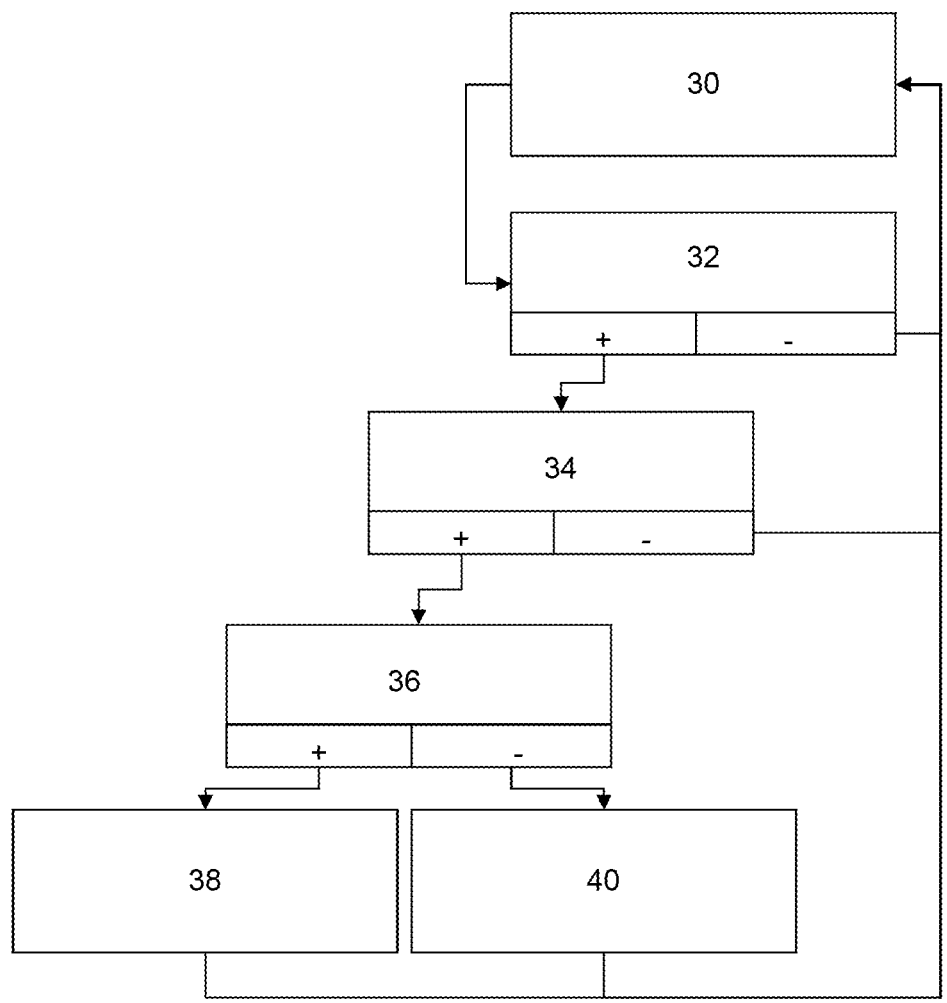
FIG. 2 is a flow diagram of the method according to an embodiment.

The method according to the invention is explained with the help of FIG. 2. In a first step 30, a head movement B of the driver's head 4 is registered. In a next step 32 it is checked if the head 4 is turned correspondingly far and correspondingly fast. For example it could be checked if the head was turned by more than approximately 25° within approximately 200 ms.

If this is affirmed by the device 6, which is represented by a plus, the control device 8 checks if there is a danger situation. For this purpose, it is enquired if the sensors 10.1, 10.2 and 12 detect corresponding movements occurring outside the vehicle. If this is not the case, step 30 is repeated. If it is determined in step 34 that there is a danger situation, step 36 is initiated, while the method returns to step 30 if there is no danger situation. In step 36 it is checked if the head movement is in the direction of the danger or away from it. If it is in the direction of the danger, which is represented by a plus, step 38 is initiated, according to which information is output in a normal time. If this is negated, in other words if the driver swivels his head 4 away from the danger situation, step 40 is initiated, according to which warning is carried out earlier and more intensively, i.e., for example louder or with brighter light or with other tones or visual signals.

Following the steps 38 or 40, the method returns to step 30. The steps 34 and 30, 32 can be alternatively switched in their sequence within the scope of the invention, so that it is initially checked if there is a danger situation or another event and the orientation O of the driver's head 4 is subsequently checked.

Figure 3:
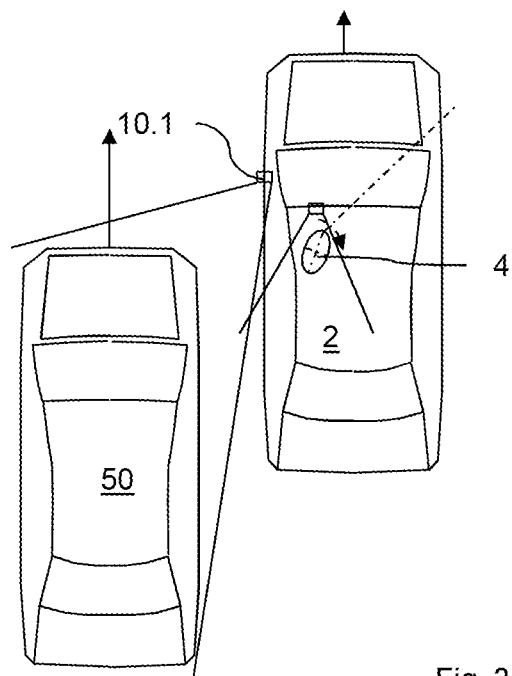
FIG. 3 is typical traffic situation.
Figure 4:
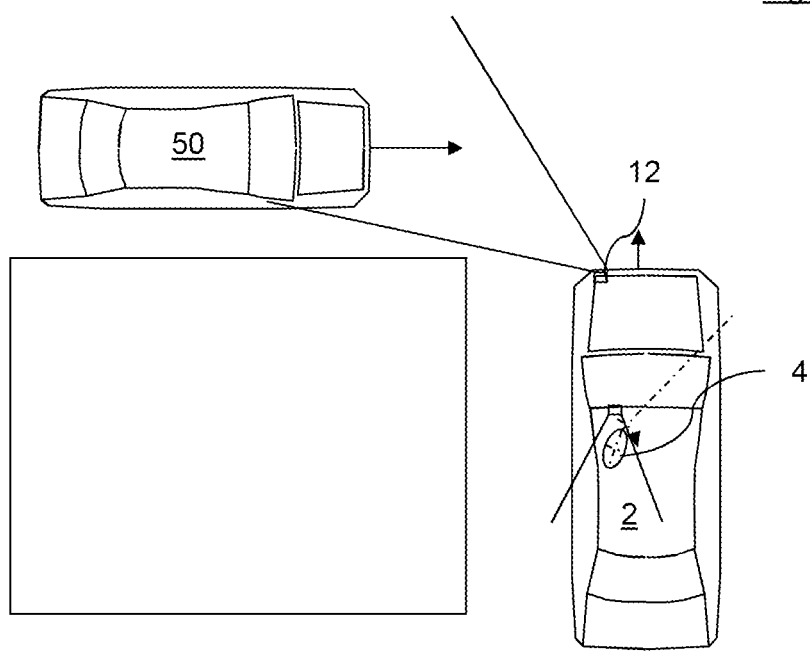
FIG. 4 is typical traffic situation.

FIG. 3 and FIG. 4 show different danger situations. FIG. 3 shows a situation, in which the driver of the motor vehicle 2 initiates a lane change, which he signals through swivel movements and/or by indicating. At the same time, the orientation of the driver's head 4 however is such that he is unable to perceive a danger which threatens to the left of the motor vehicle through a faster travelling motor vehicle 50. This is detected with the help of the blind spot sensor 10.1 and processed with the information device 6, so that the driver who happens to be looking in the other direction can be timely and intensively warned of a possible collision with the motor vehicle 50.

FIG. 4 shows a situation at an intersection, in which the motor vehicle 2 is on a collision course at an intersection with the motor vehicle 50 travelling transversely thereto. With the help of the front sensor 12, which in this case serves as part of an intersection assistant, the motor vehicle 50 can be timely detected and the driver who is looking away from the danger can be suitably warned at an early stage.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for outputting information in a motor vehicle, comprising:
    determining a static head orientation and a dynamic head movement, the dynamic head movement including a head movement speed;
    registering an event;
    identifying a time between registering of the event and an outputting of information as a function of the event head orientation;
    adjusting the time as a function of the static head orientation and the dynamic head movement; and
    outputting information as a function of the time.

2. The method according to claim 1, wherein the event comprises a traffic event that occurs outside of the motor vehicle.

3. The method according to claim 1, wherein the event comprises an activity within the motor vehicle.

4. The method according to claim 1, wherein the outputting of the information is spatially coupled to a location of the event.

5. The method according to claim 1, further comprising detecting the static head orientation and the dynamic head movement with an optical detection device.

6. The method according to claim 1, wherein the adjusting of the time between registering of the event and the outputting of information as the function of the static head orientation and the dynamic head movement is set as a function of a viewing direction of a driver.

7. The method according to claim 1, wherein the adjusting of the time between registering of the event and the outputting of information as the function of the static head orientation and the dynamic head movement is set as a function of a type of the event.

8. The method according to claim 1, wherein an intensity of the outputting of the information is set as a function of the static head orientation and the dynamic head movement.

9. A device for outputting information in a motor vehicle, comprising:
    a sensor that is configured to detect an event;
    an outputting device that is configured to output information;
    a control device that is coupled to the sensor and the outputting device; and
    an orientation device coupled to the control device and configured to detect an orientation and a movement of a driver's head, the movement of the driver's head including a head movement speed,
    wherein the control device is configured such that a time between detecting of the event and outputting of the information is dependent on the event and the time is adjusted based on the orientation and movement of the driver's head.

10. The device according to claim 9, wherein a detection device is configured to detect a viewing direction of a driver.

11. The device according to claim 9, wherein the device that is configured to detect the orientation of the driver's head is an interior camera.

12. The device according to claim 9, wherein the outputting device comprises a loudspeaker and a visual display.

13. The device according to claim 12, further comprising a driver assistance system that is coupled to the control device, wherein the sensor is part of the driver assistance system.

14. The device according to claim 13, wherein the driver assistance system comprises a lane changing assistant.

15. A method for outputting information in a motor vehicle, comprising:
    determining a static head orientation and a dynamic head movement, the dynamic head movement including a head movement speed;
    registering an event and an event location;
    identifying a time between registering of the event and an outputting of information as a function of the event head orientation;
    adjusting the time as a function of the static head orientation, the dynamic head movement, and the event location; and
    outputting information as a function of the time.

* * * * *